(12) United States Patent
Dhellemmes et al.

(10) Patent No.: US 7,934,353 B2
(45) Date of Patent: May 3, 2011

(54) PREFABRICATED PANEL WITH PROTECTIVE FILM

(75) Inventors: Jacques Dhellemmes, Versailles (FR); Nicolas Lefevre, Versailles (FR); Sophie Preato-Pavret De La Rochefordiere, Urrugne (FR); Christophe Huon De Kermadec, Versailles (FR)

(73) Assignee: Gaztransport et Technigaz, Saint-Remy-les-Chevreuse (FR)

( * ) Notice: Subject to any disclaimer, the term of this patent is extended or adjusted under 35 U.S.C. 154(b) by 907 days.

(21) Appl. No.: 11/808,830

(22) Filed: Jun. 13, 2007

(65) Prior Publication Data

US 2008/0000172 A1  Jan. 3, 2008

(30) Foreign Application Priority Data

Jun. 30, 2006  (FR) ...................... 06 05963

(51) Int. Cl.
*E04C 2/54* (2006.01)
(52) U.S. Cl. ..................... 52/783.1; 52/794.1
(58) Field of Classification Search ............... 114/65 R, 114/74 A, 78, 355; 52/783.1, 794.1, 796.1, 52/100

See application file for complete search history.

(56) References Cited

U.S. PATENT DOCUMENTS

| | | | | |
|---|---|---|---|---|
| 2,951,004 A * | 8/1960 | Rambosek et al. | ......... | 156/306.9 |
| 3,358,355 A * | 12/1967 | Youssi et al. | ..................... | 29/424 |
| 4,091,135 A * | 5/1978 | Tajima et al. | ................. | 428/40.3 |
| 4,747,513 A | 5/1988 | Betille et al. | | |
| 5,586,513 A | 12/1996 | Jean et al. | | |
| 5,916,654 A * | 6/1999 | Phillips et al. | ............... | 428/42.2 |
| 5,981,034 A * | 11/1999 | Gray et al. | ..................... | 428/193 |
| 6,035,795 A | 3/2000 | Dhellemmes et al. | | |
| 6,207,245 B1 * | 3/2001 | Miller et al. | .................. | 428/41.8 |
| 6,235,365 B1 * | 5/2001 | Schaughency et al. | ...... | 428/40.1 |
| 6,374,761 B1 | 4/2002 | Dhellemmes | | |
| 6,426,129 B1 * | 7/2002 | Kalwara et al. | .............. | 428/41.8 |
| 6,675,731 B2 * | 1/2004 | Dhellemmes | ................. | 114/74 A |
| 7,322,159 B2 * | 1/2008 | Stone et al. | .................. | 52/741.3 |
| 2004/0161570 A1* | 8/2004 | Zanchetta et al. | ............ | 428/40.1 |
| 2007/0119105 A1* | 5/2007 | MacDonald et al. | ........... | 52/235 |

FOREIGN PATENT DOCUMENTS

| | | |
|---|---|---|
| DE | 199 34 620 A1 | 1/2000 |
| EP | 0 248 721 A1 | 12/1987 |
| FR | 2 724 623 | 3/1996 |
| TW | 495471 B | 7/2002 |
| TW | 224066 B | 11/2004 |

OTHER PUBLICATIONS

Search Report in Taiwan Patent Application No. 096120787 Dated Apr. 30, 2010.

* cited by examiner

*Primary Examiner* — Brian E Glessner
*Assistant Examiner* — Adriana Figueroa
(74) *Attorney, Agent, or Firm* — Young & Thompson

(57) ABSTRACT

Panel including, in succession, a first rigid board forming the back of the panel, a first thermally insulating layer borne by the backboard, an impervious covering covering the first thermally insulating layer, a second thermally insulating layer which partially covers the impervious covering and a second rigid board covering the second thermally insulating layer, characterized in that it includes a film which covers at least part of the impervious covering which is not covered by the second thermally insulating layer, the film including at least one protective portion and at least one spew portion adjacent to the protective portion, the protective portion and the spew portion being able to be detached from the impervious covering independently of one another.

18 Claims, 1 Drawing Sheet

PREFABRICATED PANEL WITH PROTECTIVE FILM

BACKGROUND OF THE INVENTION

1. Field of the Invention

The present invention relates to the production of sealed and thermally insulated tanks incorporated into a bearing structure, particularly the hull of a ship intended for transporting liquefied gases and, in particular, for transporting liquefied natural gases with a high methane content, by sea. More specifically, the present invention relates to a panel for manufacturing such a tank and to a method of manufacture employing this panel.

2. Description of the Related Art

French Patent Application No. 2 724 623 proposes a sealed and thermally insulated tank incorporated into a bearing structure, particularly of a ship. The wall of the tank exhibits, in succession from the inside of the tank towards the bearing structure, a primary sealing barrier in contact with the product contained in the tank, a primary thermally insulating barrier and a secondary sealing barrier and a secondary thermally insulating barrier. The primary sealing barrier consists of metal strakes with edges turned up towards the inside of the tank, the said strakes being made of thin sheet with a low coefficient of expansion and being welded edge to edge via their turned-up edges to the two sides of a welding support, which is held mechanically on the primary thermally insulating barrier and constitutes a slip joint. The primary thermally insulating barrier, the secondary sealing barrier and the secondary thermally insulating barrier essentially consist of a collection of prefabricated panels fixed to the bearing structure, each panel being formed, firstly, of a first rigid board bearing a layer of thermal insulation and with it constituting a secondary thermally insulating barrier element, secondly, of a flexible or rigid covering stuck to practically the entire surface of the layer of thermal insulation of the aforementioned secondary thermally insulating barrier element, the covering consisting of a composite material the two external layers of which are fibreglass fabrics and the intermediate layer of which is a deformable thin aluminium sheet about 0.1 mm thick, the sheet forming a secondary sealing barrier element, thirdly, of a second layer of thermal insulation which partially covers the aforementioned covering and which is stuck thereto and, fourthly, a second rigid board covering the second layer of thermal insulation and with it constituting a primary thermally insulating barrier element. Tanks comprising prefabricated panels of a similar structure, in which the primary sealing barrier consists of corrugated aluminium or stainless steel strakes are also known.

The regions where two adjacent panels meet are filled in, so as to ensure the continuity of the secondary sealing barrier. More specifically, to ensure the continuity of the imperviousness of the secondary sealing barrier, provision is made for the adjacent peripheral edges of two adjacent panels in the region of the joins between panels to be covered with a strip of flexible covering comprising at least one continuous thin metal sheet, the strip being stuck to the two adjacent peripheral edges and, by its metal sheet, ensuring continuity of sealing.

The quality of the seal of the secondary sealing barrier is dependent on several factors, particularly on the quality of the bond between the strip of flexible sheet and the peripheral edges of the panels. In order to guarantee that the bond is of good enough quality, it is known practice, when bonding the strip of flexible sheet, to carry out a spew test involving:

fixing the panels to the bearing structure of the tank,
placing some adhesive tape on the panels fitted, adjacent to the region that is to be bonded,
bonding the strip of flexible sheet using an adhesive in such quantity that spew forms beside the flexible strip and partially covers the adhesive tape,
once the adhesive has cured, removing the adhesive tape,
examining the spew once the adhesive tape has been removed and validating the bond on the strength of this examination.

This manufacturing and test method has several disadvantages. Between the prefabrication of the panels and their attachment to the tank, the surface condition of the flexible or rigid covering which forms a secondary sealing barrier element may become degraded, for example during transport, storage, or while the panels are being attached, because of contamination becoming deposited on the flexible covering or as a result of the effects of external conditions, for example temperature or ultraviolet radiation. A damaged surface may give rise to a poor quality bond. Before bonding the strip of flexible sheet it is necessary to place the adhesive tape on all the panels installed, and this takes a great deal of time. In addition, the back of the adhesive tape is generally covered with a non-stick material which may migrate and greatly disrupt the bonding of the strip of flexible sheet.

SUMMARY OF THE INVENTION

It is an object of the invention to provide a method of manufacturing the tank which does not have at least some of the aforementioned disadvantages of the prior art, and a panel for implementing the method.

To do that, the invention provides a panel comprising, in succession, a first rigid board forming the back of the panel, a first thermally insulating layer borne by the backboard, an impervious covering covering the first thermally insulating layer, a second thermally insulating layer which partially covers the impervious covering and a second rigid board covering the second thermally insulating layer, characterized in that it comprises a film which covers at least part of the impervious covering which is not covered by the second thermally insulating layer, the film comprising at least one protective portion and at least one spew portion adjacent to the protective portion, the protective portion and the spew portion being able to be detached from the impervious covering independently of one another.

As the protective portion of the film covers a region of the impervious covering that is to be bonded, this region for bonding is protected and its surface condition does not degrade or does not degrade appreciably. The quality of the bond is therefore improved. In addition, since the spew portion of the film is adjacent to the region that is to be bonded, there is no need to position adhesive tape on the panels after they have been installed. On the contrary, all that is required is for the spew portion to be removed in order to carry out the spew test. The on-site manufacturing time is thus shorter. In addition, the absence of adhesive tape makes it possible to avoid there being any non-stick product in the tank and therefore makes it possible to improve the security of the bonding.

For preference, the film covers all of the impervious covering which is not covered by the second thermally insulating layer.

Advantageously, the protective portion is adjacent to one edge of the panel.

According to one embodiment, the panel has a rectangular shape in plan view, the film having four protective portions adjacent to the four edges of the impervious covering and four spew portions, one adjacent to each of the four protective portions.

By virtue of these features, it is possible to remove one of the four protective portions just before bonding the region that is to be bonded that it covers, without removing the other ones. Thus, the other regions for bonding remain protected as long as they are covered.

According to one particular embodiment, the protective portion and the spew portion consist of a single sheet which has a precut.

In this case, the panel can be manufactured simply by placing the single precut sheet in such a way as to produce the protective portion and the spew portion in a single step. In addition, the precut is made during the prefabrication of the panel or of the impervious covering and can therefore be positioned accurately.

Advantageously, the panel comprises a reinforcing layer laid on the spew portion.

By virtue of these features it is possible to choose, for the single sheet, a material that is appropriate to protecting the impervious covering, without having to give consideration to strength constraints associated with the spew test.

According to one particular embodiment, the protective portion and the spew portion each consist of two different sheets of different materials and/or different thicknesses.

Thus, a sheet with properties tailored to protecting the impervious covering and to the spew test can be chosen for the protective portion and for the spew portion respectively. The two sheets may be laid simultaneously or during the same phase in the prefabrication.

For preference, the impervious covering comprises a flexible metal sheet and, on each side of the metal sheet, a layer comprising a fibreglass fabric.

Advantageously, the film has a test portion that can be detached from the impervious covering independently of the protective portion and of the spew portion.

By virtue of these features it is possible to test the bondability of the impervious covering secured to the panel on site in a shorter space of time, and to do so for a broad region of the impervious covering. Tests known from the prior art, such as measuring the surface energy or wettability, take a great deal of time, which is incompatible with an on-site test, and only ever characterize the points measured alone.

The invention also provides a method of manufacturing a sealed and thermally insulated tank, characterized in that it comprises the steps involving:
  fixing panels according to the invention above to the bearing structure of the tank,
  removing the protective portions from adjacent panels,
  sticking a strip of impervious covering onto the regions uncovered by the protective portions removed using an adhesive so as to ensure the continuity of the secondary sealing barrier,
  once the adhesive is cured, removing the spew portions adjacent to the uncovered regions,
  examining the adhesive spew formed and validating the bonding of the strip of impervious covering on the strength of this examination.

For preference, the strip of impervious covering comprises a flexible metal sheet and, on each side of the metal sheet, a layer comprising a fibreglass fabric.

BRIEF DESCRIPTION OF THE DRAWING FIGURES

The invention will be better understood and other objects, details, features and advantages thereof will become more clearly apparent in the course of the following description of a number of particular embodiments of the invention which are given solely by way of non-limiting illustration with reference to the attached drawings. In these drawings.

DETAILED DESCRIPTION OF THE INVENTION

Figure 1:
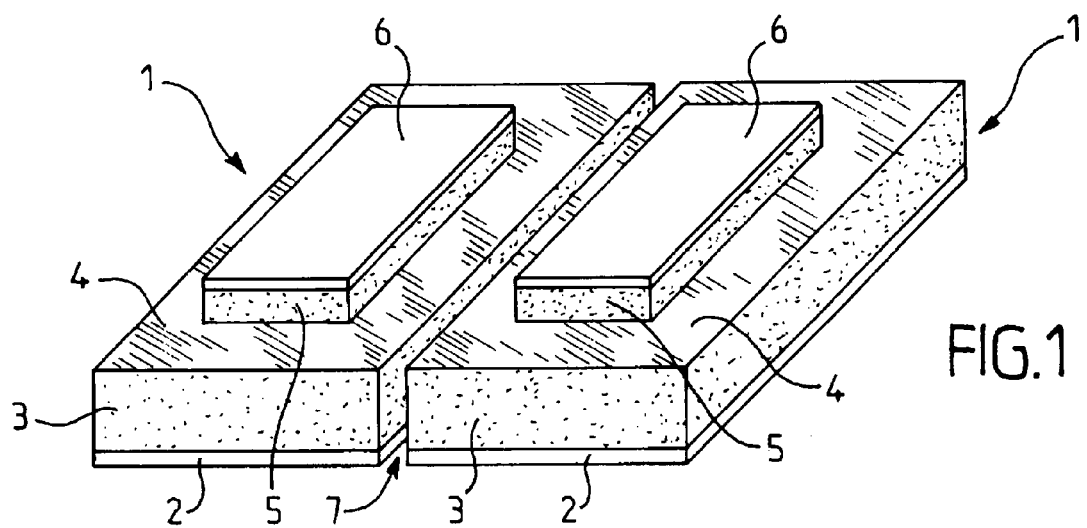
FIG. 1 is a perspective view of two adjacent prefabricated panels according to an embodiment of the invention.

FIG. 1 depicts two prefabricated panels 1 fixed adjacent to one another on the bearing structure (not depicted) of a tank for transporting liquefied natural gas by sea.

Each panel 1 comprises a rigid backboard 2, for example made of plywood, and a first layer of thermal insulation 3, for example made of glass fibre reinforced polyurethane foam, which covers the backboard 2. The backboard 2 and the first layer of thermal insulation 3 together form a secondary thermally insulating barrier element. An impervious covering 4 is stuck to the first layer of thermal insulation 3 on the opposite side to the backboard 2. The impervious covering 4 may be rigid or flexible and comprises three layers, namely a sheet of aluminium about 0.1 mm thick, surrounded with fibreglass fabric and constitutes a secondary sealing barrier element. A second layer of thermal insulation 5, for example made of glass fibre-reinforced polyurethane foam, is bonded to the impervious covering 4, and a top board 6, for example made of plywood, covers the second layer of thermal insulation 5. The second layer of thermal insulation 5 and the top board 6 together form a primary thermally insulating barrier element.

In plan view, the backboard 2, the first layer of thermal insulation 3 and the impervious covering 4 have the shape of a first rectangle. The second layer of thermal insulation 5 and the top board 6 have the shape of a second rectangle with the same centre as the first but of a smaller size. Thus, the impervious covering 4 has a peripheral edge which is not covered by the second layer of thermal insulation 5.

Figure 2:
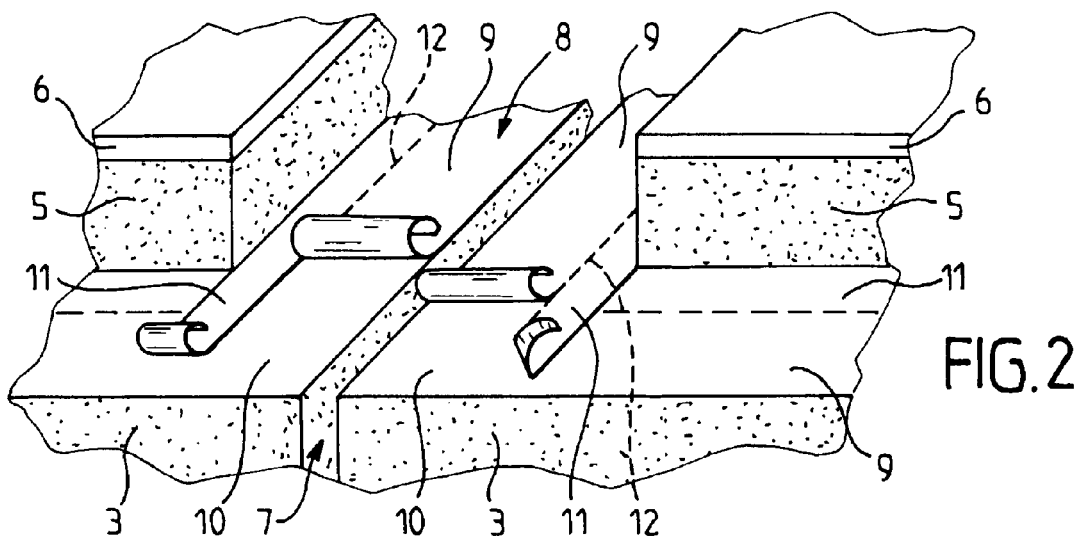
FIG. 2 depicts a detail of the panels of FIG. 1 and shows how the film can be removed from the panels.

The peripheral edge of the impervious covering 4 is covered by a film 8, as can be seen in FIG. 2. In the embodiment depicted, the film 8 completely covers the peripheral edge of the impervious covering 4. In another embodiment, the film 8 leaves uncovered a narrow region of the impervious covering 4 adjacent to the second layer of thermal insulation 5. The film 8 comprises two protective portions 9 each of which extends along a long side of the impervious covering 4, and two spew portions 11, each of which extends adjacent to these protective portions 9. The film 8 also comprises two other protective portions 9 each of which extends along a short side of the impervious covering 4, between the aforementioned two spew portions 11, and two other spew portions 11, each of which extends adjacent to these other protective portions 9. FIG. 2 depicts protective portions 9 and spew portions 11 which have been partially removed from the impervious covering 4.

In the embodiment depicted, the film 8 consists of a single sheet, for example a sheet of polyethylene or of card material, bonded to the impervious covering 4, and which has precuts 12 dividing the various protective portions 9 and spew portions 11 from one another. In a variant, a reinforcing layer, for example a fibreglass fabric, is provided on the spew portions 11. In another embodiment, the protective portions 9 and the spew portions 11 of the film 8 are made of different materials and/or have different thicknesses.

The adhesive of the film 8 which sticks it to the impervious covering 4 is, for example, an adhesive of the acrylic or rubber type. These types of adhesive have the advantage of leaving no traces on the impervious covering 4 once the film has been removed, or at least of not leaving any traces detrimental to the bonding of the strip of impervious covering 13 described hereinbelow. In addition, this type of adhesive allows the panels 1 to be stored for relatively long periods, for example of several months, without the properties of the adhesive degrading, for example as a result of the action of ultraviolet radiation, temperature or humidity.

By fixing a plurality of rectangular prefabricated panels 1, and possibly panels of a similar structure that are trapezoidal or some other shape, to the bearing structure of a tank, most of the secondary thermally insulating barrier, of the secondary sealing barrier and of the primary thermally insulating barrier of the tank is formed in a single step. Next, the continuity of these barriers between the panels 1 is established and the primary sealing barrier is fitted. The operations of fixing the panels 1 to the bearing structure, establishing the continuity of the secondary and primary thermally insulating barriers, and of positioning the primary sealing barrier can be performed using techniques known to those skilled in the art, for example as described in documents FR-A-2 724 623 mentioned hereinabove and FR-A-2 781 557. The continuity of the secondary sealing barrier can be established using the technique described hereinbelow.

Having fixed the panels 1 to the bearing structure and established the continuity of the secondary thermally insulating barrier, the protective portions 9 which cover two adjacent edges of two adjacent panels 1 between which there is a space 7 are removed. This then uncovers two regions for bonding 10 of the panels 1. At this stage, the other protective portions 9 of the panels 1 are not removed, so as to continue to protect the bonding regions that they cover.

Figure 3:
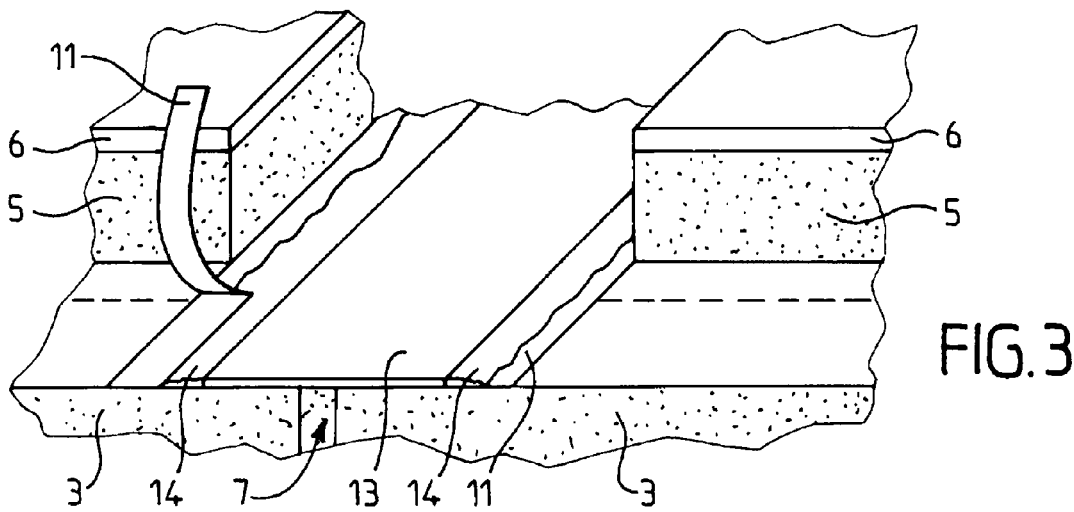
FIG. 3 depicts a detail of the panels of FIG. 1 during the spew test.

Next, the uncovered regions for bonding 10 are coated with adhesive and a strip of flexible impervious covering 13 with the same three-layer structure as the impervious covering 4 is laid in such a way that the strip 13 is bonded to the two regions for bonding 10 of the two adjacent panels 1, covering the space 7, as shown in FIG. 3. Adhesive spew 14 therefore forms on each side of the strip 13 and partially covers the spew portions 11 which were adjacent to the protective portions 9 removed.

In order to check the quality of the bonding of the strip 13, a spew test is then performed, that is to say that once the adhesive has cured, the spew portions 11 are removed, as depicted in the left-hand part of FIG. 3, and the remaining adhesive spew 14 is examined.

In an embodiment that has not been depicted, the film 8 exhibits a test portion that can be detached from the impervious covering 4 independently of the protective portions 9 and the spew portions 11. This test portion consists for example of a tab delimited by a rectangular precut on a spew portion 11. A peel test can then be performed on site, for example just before fixing the panel 1 to the bearing structure, this test consisting in peeling the tab back at 180° in order to remove it, and measuring the force required using scales. If the force required does not fall within a given range, this shows that the surface of the impervious covering 4 has been damaged or contaminated and is unsuitable for bonding. The impervious covering 4 can then be cleaned prior to bonding or the panel 1 can be scrapped.

Although the invention has been described in conjunction with a number of particular embodiments, it is quite clear that it is not in any way restricted thereto and that it comprises all technical equivalents of the means described and combinations thereof provided that these fall within the scope of the invention.

The invention claimed is:

1. A panel (1) comprising, in succession: a first rigid board (2) forming a backboard of the panel;
   a first thermally insulating layer (3) borne by the backboard;
   an impervious covering (4) covering the first thermally insulating layer;
   a second thermally insulating layer (5) which partially covers the impervious covering and a second rigid board (6) covering the second thermally insulating layer; and
   a film (8) which covers at least part of the impervious covering which is not covered by the second thermally insulating layer, the film comprising at least one protective portion (9) and at least one spew portion (11) adjacent to the protective portion and separated by a pre cut, the protective portion and the spew portion being bonded to the impervious covering and being able to be detached from the impervious covering independently of one another by the precut.

2. The panel according to claim 1, wherein the film covers all of the impervious covering which is not covered by the second thermally insulating layer.

3. The panel according to claim 1, wherein the protective portion is adjacent to one edge of the panel.

4. The panel according to claim 3, wherein, in plan view, the panel has a rectangular shape, the film having four protective portions adjacent to the four edges of the impervious covering and four spew portions, one adjacent to each of the four protective portions.

5. The panel according to claim 1, wherein the protective portion and the spew portion consist of a single sheet.

6. The panel according to claim 5, wherein the panel includes a reinforcing layer laid on the spew portion.

7. The panel according to claim 1, wherein the protective portion and the spew portion each consist of two different sheets of different materials and/or different thicknesses.

8. The panel according to claim 1, wherein the impervious covering comprises a flexible metal sheet and, on each side of the metal sheet, a layer comprising a fibreglass fabric.

9. The panel according to claim 1, wherein the film has a test portion that can be detached from the impervious covering independently of the protective portion and of the spew portion.

10. The panel according to claim 2, wherein the protective portion is adjacent to one edge of the panel.

11. The panel according to claim 2, wherein the protective portion and the spew portion consist of a single sheet.

12. The panel according to claim 3, wherein the protective portion and the spew portion consist of a single sheet.

13. The panel according to claim 4, wherein the protective portion and the spew portion consist of a single sheet.

14. The panel according to claim 2, wherein the protective portion and the spew portion each consist of two different sheets of different materials and/or different thicknesses.

15. The panel according to claim 3, wherein the protective portion and the spew portion each consist of two different sheets of different materials and/or different thicknesses.

16. The panel according to claim 4, wherein the protective portion and the spew portion each consist of two different sheets of different materials and/or different thicknesses.

17. The panel according to claim 2, wherein the impervious covering comprises a flexible metal sheet and, on each side of the metal sheet, a layer comprising a fibreglass fabric.

18. The panel according to claim 3, wherein the impervious covering comprises a flexible metal sheet and, on each side of the metal sheet, a layer comprising a fibreglass fabric.

* * * * *